US005357611A

United States Patent [19]

Kaneshima

[11] Patent Number: 5,357,611

[45] Date of Patent: Oct. 18, 1994

[54] CENTRALIZED SUPERVISORY CONTROL SYSTEM FOR CENTRALLY SUPERVISING A PLURALITY OF SUPERVISED APPARATUSES

[75] Inventor: Toshihito Kaneshima, Kawasaki, Japan

[73] Assignee: Fujitsu Limited, Japan

[21] Appl. No.: 905,346

[22] Filed: Jun. 29, 1992

[30] Foreign Application Priority Data

Jul. 4, 1991 [JP] Japan .................................. 3-164109

[51] Int. Cl.[5] ............................................ G06F 13/00

[52] U.S. Cl. .................................... 395/200; 395/575; 364/DIG. 1

[58] Field of Search ............... 395/200, 575, 275, 425; 364/200

[56] References Cited

U.S. PATENT DOCUMENTS 5,191,648 3/1993 Ikenoue et al. ..................... 395/200

*Primary Examiner*—Dale M. Shaw
*Assistant Examiner*—Gaurav Bhatia
*Attorney, Agent, or Firm*—Greer, Burns & Crain, Ltd.

[57] ABSTRACT

A centralized supervisory control system allowing a centralized supervisory control center exactly to grasp information about failures and other events occurring in a plurality of supervised apparatuses, the center being also notified of time-of-day indications corresponding to such occurrences. Each of the supervised apparatus turns its information into blocks for output to an intermediate control apparatus. The intermediate control apparatus continuously collects such status data from the supervised apparatuses and compares the data with the status data currently held in its memory. If the latest status data from a given supervised apparatus are found to contain a deviation from the old data, the latest data are stored in memory along with a time-of-day indication corresponding to the deviation. The latest status data and the time-of-day indication are sent to the centralized supervisory control center. The intermediate control apparatus transfers chronologically the information from the multiple supervised apparatuses to the centralized supervisory control center. If the centralized supervisory control center is stopped or if line disconnection occurs, the previously collected information about the supervised apparatuses is controlled chronologically by the intermediate control apparatus. When the centralized supervisory control center resumes its service, the information about the supervised apparatuses is transferred to the centralized supervisory control center. If the memory area for accommodating supervised apparatus information becomes full, the oldest information is deleted therefrom on a first-in first-out basis to make way for the new. The status data in the same block as that of the deleted data are then transferred to the centralized supervisory control center.

2 Claims, 4 Drawing Sheets

CENTRALIZED SUPERVISORY CONTROL SYSTEM FOR CENTRALLY SUPERVISING A PLURALITY OF SUPERVISED APPARATUSES

BACKGROUND OF THE INVENTION

1. Field of the Invention

The present invention relates to a centralized supervisory control system for centrally supervising a plurality of supervised apparatuses.

2. Description of the Prior Art

Centralized supervisory control systems are required accurately to report events or irregularities occurring in any of a plurality of apparatuses under their control, along with time-of-day indications corresponding to such occurrences. What is required for such a control system involves notifying personnel at a centralized control center of information about failures and other events occurring in any of a plurality of supervised apparatuses under system control, the personnel being also informed of the times of day corresponding to such occurrences.

A typical prior art centralized supervisory control system will be described with reference to FIG. 1. In the centralized supervisory control system of FIG. 1, a centralized supervisory control center 2 is connected to a plurality of stations 1*a*, 1*b* and 1*c*. Each of the stations 1*a*, 1*b* and 1*c* comprises an intermediate control apparatus 3 and a plurality of supervised apparatuses 4 through 8 connected to the apparatus 3. The intermediate control apparatus 3 continuously collects information about the supervised apparatuses 4 through 8 and forwards the collected information to the centralized supervisory control center 2.

On receiving the information about a failure in any supervised apparatus from the intermediate control apparatus 3, the centralized supervisory control center 2 attaches a time-of-day indication to that information. The received information is displayed on a monitor or the like together with the corresponding time-of-day indication. By observing the displayed contents, the operator at the center 2 checks the status of the supervised apparatuses 4 through 8 in each of the stations 1*a*, 1*b* and 1*c*.

If the centralized supervisory control center 2 is stopped for maintenance or other purposes or if any of the lines connected to the centralized supervisory control center 2 is disconnected, the time-of-day indication of the information received during service disruption is made the same as that given when the centralized supervisory control center is back in service. This is because only when information is received is the time-of-day indication attached thereto made available for display. As a result, the centralized supervisory control center 2 is barred from finding the exact time of day at which a failure occurred in any of its subordinate apparatuses.

Where the scale of the centralized supervisory control system is expanded, it takes time to collect information about the supervised apparatuses under control of the system. This also results in the inability of the system to detect the exact times of failures in its subordinate apparatuses. In addition, where a display device is connected to the intermediate control apparatus, the time-of-day indication attached to a certain event by the intermediate control apparatus may differ from that attached thereto by the centralized supervisory control center.

SUMMARY OF THE INVENTION

It is therefore an object of the present invention to provide a centralized supervisory control system that allows a centralized supervisory control center to detect the exact time at which a failure or other event took place in any of the supervised apparatuses under control of that system.

It is another object of the invention to provide a centralized supervisory control system that allows a centralized supervisory control center after its service disruption to be notified of information about failures and times at which failures occurred in any of a plurality of supervised apparatuses under center control while the center was being stopped.

In accordance with an aspect of the present invention, there is provided a centralized supervisory control system including a centralized supervisory control center for centrally supervising a plurality of supervised apparatuses, the centralized supervisory control system comprising: means for dividing information from the supervised apparatuses into units of blocks and outputting the blocks as status data; and an intermediate control apparatus operatively connected to each of the supervised apparatuses and to the centralized supervisory control center for collecting continuously the information sent from the supervised apparatuses; the intermediate control apparatus comprising: current status control and storage means for receiving the status data sent from any of the supervised apparatuses and storing into a link-like queue the status data on a first-in first-out basis together with indications of the times at which the status data were output; judging means for comparing, after status data storage into the current status control and storage means, the stored status data with the status data coming anew from the supervised apparatuses in order to determine if there exists the same data block; deviation data creating means for comparing, when the judging means detects the same data block, the previously stored status data with the newly received status data in the same block to determine if the newly received status data contain any deviation, and creating, if such deviation exists, deviation data made of the content of the deviation and a time-of-day indication applicable to the deviation; deviation status control and storage means for storing the deviation data consecutively into a link-like queue on a first-in first-out basis; transfer request flag control means for turning on a transfer request flag so as to transfer to the centralized supervisory control center data selected from the group consisting of the deviation data and the latest status data, the transfer request flag being turned on when the deviation status control and storage means has stored the deviation data, or when the judging means has not detected the same data block and causing the newly received status data to be stored as the latest status data into the current status control and storage means; and transfer means for transferring to the centralized supervisory control center data* selected from the group consisting of the deviation data and the latest status data when the transfer request flag is turned on.

In a preferred structure according to the invention, there may be further provided with flag activating means and status data check and transfer means. The flag activating means acts if the deviation data are deleted from the deviation status control and storage means. This turns on the flag of the status data in the block corresponding to the block of the deleted deviation data. The status data check and transfer means checks the flags of the status data, and transfers to the centralized supervisory control center the status data pointed to by the flag turned on by the flag activating means.

The above and other objects, features and advantages of the present invention and the manner of realizing them will become more apparent, and the invention itself will best be understood, from a study of the following description and appended claims with reference to the attached drawings showing some preferred embodiments of the invention.

DESCRIPTION OF THE PREFERRED EMBODIMENTS

Figure 1:
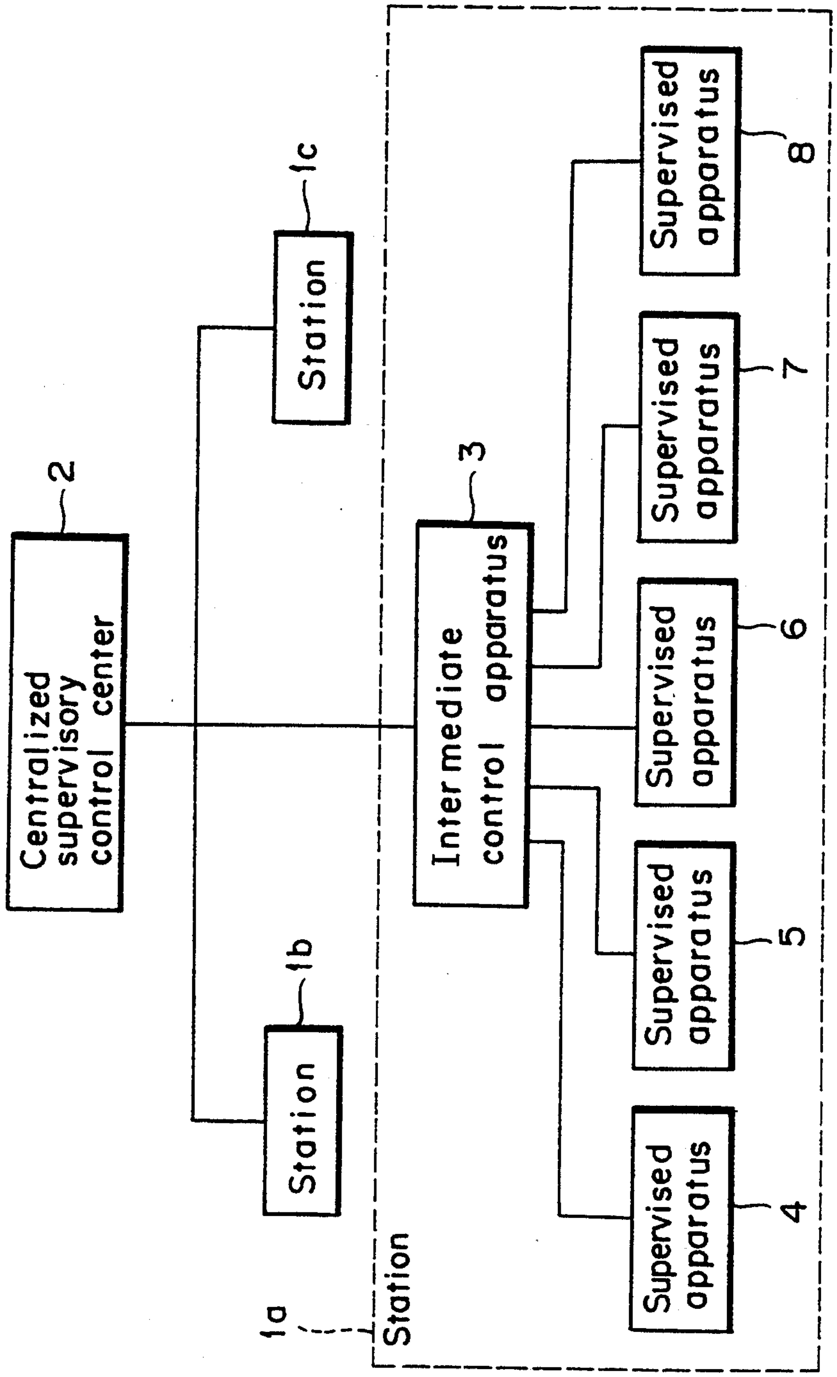
FIG. 1 PRIOR ART
FIG. 1 is a block diagram of a typical prior art centralized supervisory control system.
Figure 2:
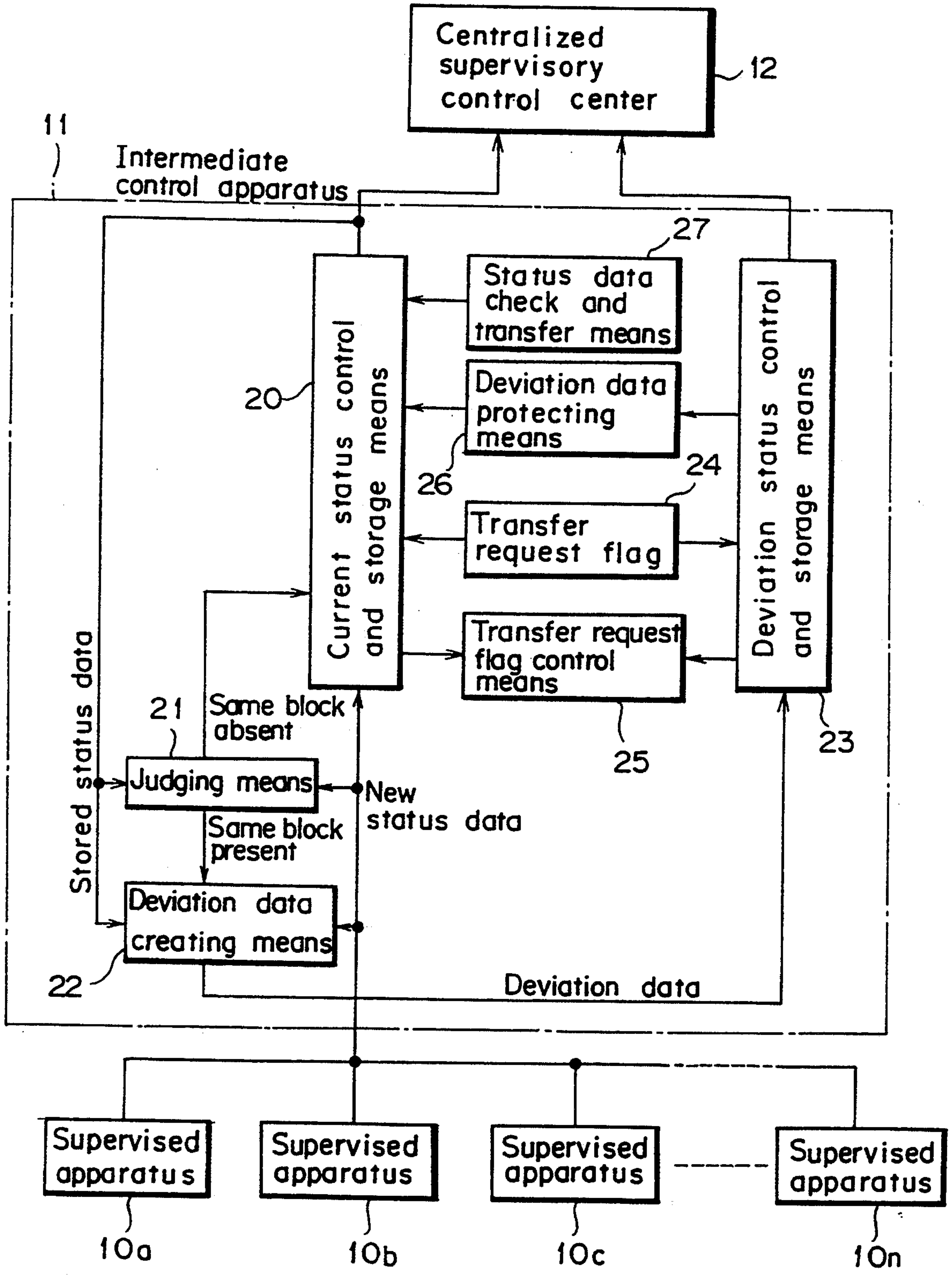
FIG. 2 is a block diagram of a centralized supervisory control system embodying the present invention.

Referring to FIG. 2, the inventive centralized supervisory control system comprises a plurality of supervised apparatuses 10*a*, 10*b*, . . . , 10*n* made of a transmitter and other components each; an intermediate control apparatus 11 for continuously collecting information from the supervised apparatuses 10*a* through 10*n*; and a centralized supervisory control center 12 for supervising the supervised apparatuses 10*a* through 10*n* by receiving information from the intermediate control apparatus 11. Each of the supervised apparatuses 10*a* through 10*n* divides the information into blocks before sending them to the intermediate control apparatus 11.

Figure 3:
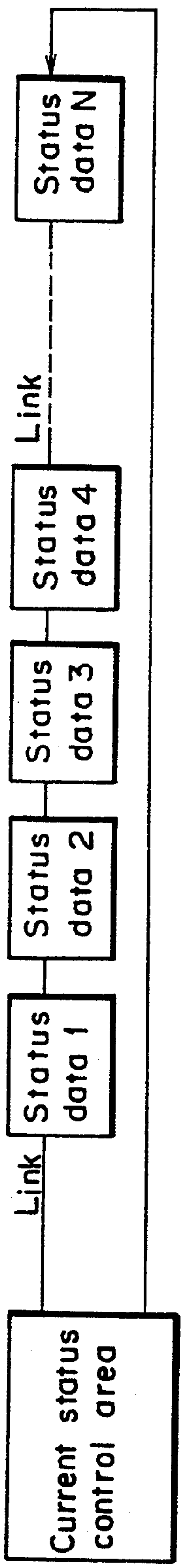
FIG. 3 is a view depicting how status data are stored illustratively into current status control and storage means contained in the embodiment of FIG. 2.

In the intermediate control apparatus 11, current status control and storage means 20 receives the status data sent in blocks from the supervised apparatuses 10*a* through 10*n*, and stores the data into a link-like queue on a first-in first-out basis (FIG. 3) together with indications of the times at which the data were output. The current status control and storage means 20 further stores in its current status control area the flags corresponding to the status data stored into the link-like queue as described. Judging means 21 compares, after status data storage into the current status control and storage means 20, the status data stored in the means 20 with the status data coming anew from the supervised apparatuses 10*a* through 10*n*, in order to determine if there exists the same data block.

Figure 4:
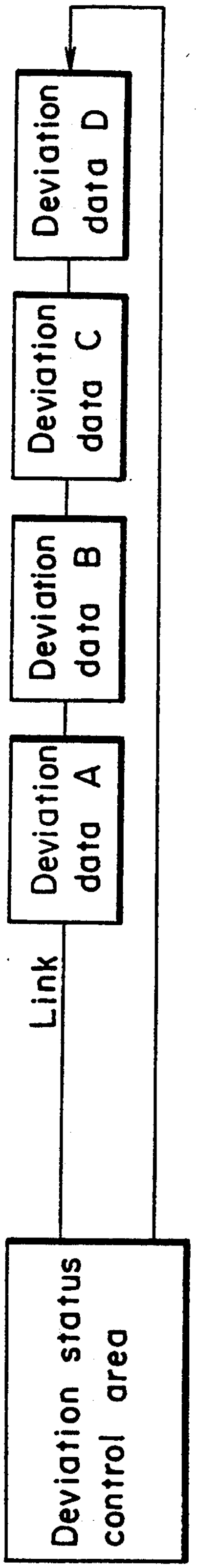
FIG. 4 is a view describing how deviation data are stored illustratively into deviation status control and storage means included in the embodiment of FIG. 2.

Deviation data creating means 22 acts when the judging means 21 detects the same data block, thus comparing the previously stored status data with the newly received status data in the same block to determine if the newly received status data contain any deviation. The deviation data creating means 22 then creates, if such deviation exists, deviation data made of the content of the deviation and a time-of-day indication applicable to that deviation. Deviation status control and storage means 23 stores the deviation data from the deviation data creating means 22 consecutively into a link-like queue on a first-in first-out basis, as shown in FIG. 4. The deviation data thus stored are deleted after being output.

Transfer request flag control means 25 turns on a transfer request flag 24 so as to transfer to the centralized supervisory control center 12 either the deviation data or the latest status data. The transfer request flag 24 is turned on if the deviation status control and storage means 23 has stored the deviation data. The transfer request flag is also turned on if the judging means 21 has not detected the same data block, thus causing the newly received status data to be stored as the latest status data into the current status control and storage means 20.

Furthermore, the intermediate control apparatus 11 includes deviation data protecting means 26 and status data check and transfer means 27. The deviation data protecting means 26 acts if the deviation data are deleted from the deviation status control and storage means 23, thus turning on the flag of the status data in the block corresponding to the block of the deleted deviation data. The status data check and transfer means 27 checks the flags of the status data and transfers to the centralized supervisory control center 12 the status data pointed to by the flag being turned on.

In operation, when the intermediate control apparatus 11 is activated, the status data sent thereto by the supervised apparatuses 10*a* through 10*n* are stored consecutively into the current status control and storage means 20. The status data are then forwarded to the centralized supervisory control center 12. The status data stored consecutively in the current status control and storage means 20 are made of the chronologically transmitted status of the supervised apparatuses 10*a* through 10*n* and of indications of the times at which the data were output. On receiving these status data, the centralized supervisory control center 12 displays the states of the supervised apparatuses 10*a* through 10*n* along with the time-of-day indications corresponding to such states. At any given time, the operator at the centralized supervisory control center 12 knows exactly what is occurring in any of the supervised apparatuses 10*a* through 10*n* and the time of day of such occurrence.

After status data storage into the current status control and storage means 20 upon activation of the intermediate control apparatus 11, the judging means 21 compares the status data that came from the supervised apparatuses 10*a* through 10*n* with the status data stored in the means 20. Through the comparison, the judging means 21 checks to see if the status data of the same block exist. If the same block is not detected, the newly received status data are stored as the latest status data into the link-like queue of the current status control and storage means 20 on a first-in first-out basis. Then the transfer request flag control means 25 turns on the transfer request flag 24, whereby the latest status data are transferred to the centralized supervisory control center 12.

If the judging means 12 detects the same block, the deviation data creating means 22 compares the already stored status data of the same block with the newly received status data. If the newly received status data are found to contain a deviation, the deviation data creating means 22 creates deviation data made of the content of the deviation and of an indication of the time at which the deviation occurred. If no deviation is detected in the newly received status data, no deviation data will be created. As they are created consecutively, the deviation data are stored into the link-like queue of the deviation status control and storage means 23. Then the transfer request flag control means 25 turns on the transfer request flag 24, whereby the stored deviation data are transferred to the centralized supervisory control center 12. After their transfer to the centralized supervisory control center 12, the deviation data are deleted from the deviation status control and storage means 23.

As described, both the latest status data and the deviation data transferred to the centralized supervisory control center 12 contain indications of the times at which the data were output by the supervised apparatuses 10*a* through 10*n*. Thus it is possible to know exactly what failure or event occurred in any of the supervised apparatuses 10*a* through 10*n* along with time-of-day indications corresponding to such occurrences. Where numerous supervised apparatuses are connected to a growing number of intermediate control apparatuses 11 that constitute a large-scale centralized supervisory control system, it is still possible to know exactly the times at which failures, irregularities or other events occurred in any of the many supervised apparatuses.

Below is a description of how the intermediate control apparatus 11 works when furnished additionally with the deviation data protecting means 26 and the status data check and transfer means 27.

Illustratively, if the centralized supervisory control center 12 is stopped for maintenance or other purposes or if any of the lines connected to the center 12 is disconnected, the information output by the supervised apparatuses 10*a* through 10*n* may not be transferred to the centralized supervisory control center 12 for an extended period of time. During the service interruption, the status data are continuously sent from the supervised apparatuses 10*a* through 10*n*, filling the storage area of the deviation status control and storage means 23 in the intermediate control apparatus 11. With the storage area fully occupied, the excess deviation data entering the deviation status control and storage means 23 will cause the previously stored deviation data destined but not transferred to the centralized supervisory control center 12 to be deleted on a first-in first-out basis.

Suppose that the deleted deviation data had been intended to recover failure information about a given supervised apparatus, the information having being transferred to the intermediate control apparatus 11 immediately before data transfer to the centralized supervisory control center 12 was disrupted due to, say, line disconnection. In that case, even if the disconnected line is repaired and becomes serviceable, the information for erasing the failure display from the monitor of the centralized supervisory control center 12 fails to be transferred thereto. That is, the failure display remains unchanged and fails to reflect the status of the currently repaired supervised apparatus.

This is where the deviation data protecting means 26 and the status data check and transfer means 27 make a positive difference. If the deviation data stored in the deviation status control and storage means 23 are deleted therefrom, the deviation data protecting means 26 turns on the flag of the status data in the block corresponding to the block of the deleted deviation data. With the disconnected line repaired, the status data check and transfer means 27 transfers to the centralized supervisory control center 12 the status data pointed to by the flag being turned on. That is, the status data are transferred in place of the deleted deviation data. This means that there no longer occurs a situation where the failure display remains unchanged at the centralized supervisory control center 12 after repair of line disconnection.

According to the invention, the status data replacing the deleted deviation data contain an indication of the time at which the deviation data were stored. This allows personnel at the centralized supervisory control center 12 to know exactly those states of the supervised apparatuses 10*a* through 10*n* which were in effect during data transfer disruption, together witch time-of-day indications corresponding to those states. This data recovery function provides the same deviation data recovery as described above if the deviation data are deleted while the centralized supervisory control center 12 is being stopped for an extended period of time for maintenance.

As many apparently different embodiments of this invention may be made without departing from the spirit and scope thereof, it is to be understood that the invention is not limited to the specific embodiments thereof except as defined in the appended claims.

What is claimed is:

1. A centralized supervisory control system comprising:

a centralized supervisory control center for centrally supervising a plurality of supervised apparatuses; said centralized supervisory control center detecting exact times of functions or events in any of the supervised apparatuses;

said supervised apparatuses each including means for dividing failure and event information produced by said supervised apparatuses into units of blocks and outputting said blocks as status data; and an intermediate control apparatus operatively connecting each of said supervised apparatuses to said centralized supervisory control center, said intermediate control apparatus collecting continuously the information sent from said supervised apparatuses;

said intermediate control apparatus comprising:

current status control and storage means for receiving the blocks as status data sent from any of said supervised apparatuses and storing into a link-like queue said blocks as status data on a first-in first-out basis as stored blocks together with indications of the times at which said blocks as status data were output;

judging means for comparing, after blocks as status data are stored into said current status control and storage means, said stored blocks with blocks coming anew from said supervised apparatuses to determine if said blocks coming anew already exist as stored blocks;

deviation data creating means for comparing, when said judging means detects a block coming anew which is the same as a stored block, the previously stored status data with the newly received status data in the same block to determine if said newly received status data contain any deviation, and creating, if such deviation exists, deviation data made of the content of said deviation and a time-of-day indication applicable to said deviation;

deviation status control and storage means for storing said deviation data consecutively into a link-like queue on a first-in first-out basis;

transfer request flag control means for turning on a transfer request flag so as to transfer to said centralized supervisory control center data selected from a group consisting of said deviation data and latest status data within said current status control and storage means, the transfer request flag being turned on when said deviation status control and storage means has stored said deviation data, or when said judging means has not detected a block coming anew which is the same as a stored block and causing said newly received status data to be stored as said latest status data into said current status control and storage means; and transfer means for transferring to said centralized supervisory control center data selected from the group consisting of said deviation data and said latest status data when said transfer request flag is turned on.

2. A centralized supervisory control system according to claim 1, further comprising:

flag activating means for turning on, if said deviation data are deleted from said deviation status control and storage means, the flag associated with the status data in the status data block corresponding to the block of the deleted deviation data; and status data check and transfer means for checking the flags associated with the status data and transferring to said centralized supervisory control center the status data pointed to by the flag turned on by said flag activating means.

* * * * *